Nov. 17, 1925.
W. SHELDON
DRILL PIPE COUPLING
Filed July 13, 1925
1,562,373
2 Sheets-Sheet 1
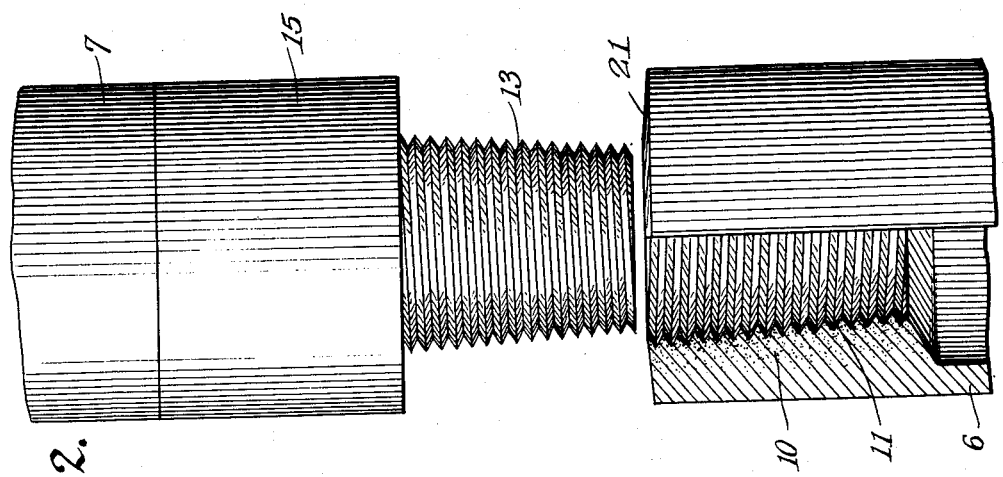
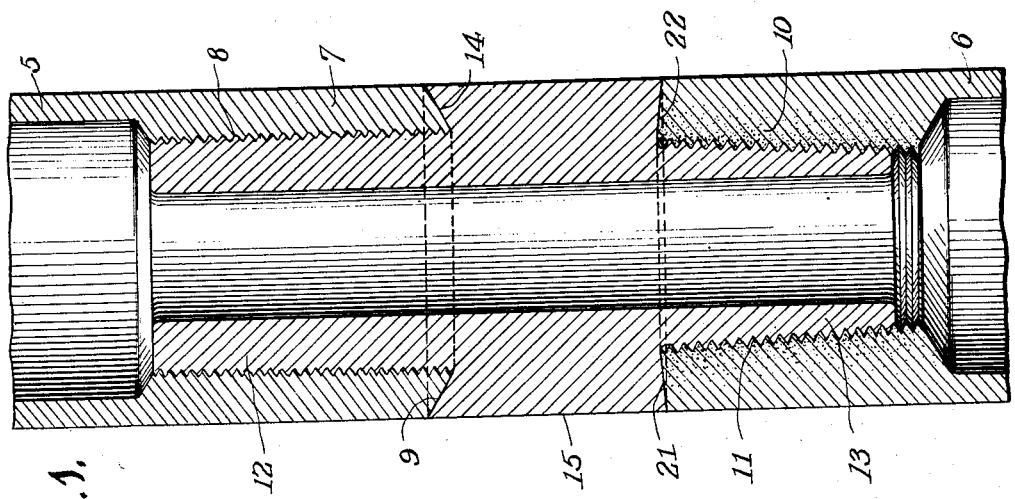
INVENTOR
Waldo Sheldon
BY
Philip S. McLean.
ATTORNEY Nov. 17, 1925.  W. SHELDON  1,562,373

DRILL PIPE COUPLING

Filed July 13, 1925  2 Sheets-Sheet 2

INVENTOR
Waldo Sheldon
BY
Philip S. McLean
ATTORNEY

Patented Nov. 17, 1925.

1,562,373

UNITED STATES PATENT OFFICE.

WALDO SHELDON, OF SOUTH NORWALK, CONNECTICUT.

DRILL-PIPE COUPLING.

Application filed July 13, 1925. Serial No. 43,131.

*To all whom it may concern:*

Be it known that I, WALDO SHELDON, a citizen of the United States, and a resident of South Norwalk, county of Fairfield, and State of Connecticut, have invented certain new and useful Improvements in Drill-Pipe Couplings, of which the following is a specification.

In oil well drilling the practice has been to couple the sections of drill pipe by "tool joints" of the "box and pin" type. These joints necessarily are quite heavy to withstand the "whipping" action of the pipe, they are relatively expensive and under the hard service ordinarily experienced produce failures commonly known as "twist-offs." The usual tool joints, furthermore, are bulky affairs of materially greater diameter than the drill pipe and so prevent continuous passage of the drill pipe through the stuffing box or the like.

The objects of this invention particularly are to overcome the faults and limitations referred to and to provide a simple practical form of joint, flush with the pipe, having the readily separable and long wearing characteristics of the tool joint but simpler, of fewer parts and less expensive than the tool joints.

In the accompanying drawing forming part of this specification, the invention is illustrated embodied in a few of the possible commercial forms, but it should be understood that the structure may vary without departure from the broad spirit and scope of the following description and claims.

Figures 1 and 2 are vertical sectional views of the new joint in the coupled and uncoupled relations respectively.

Figure 4:
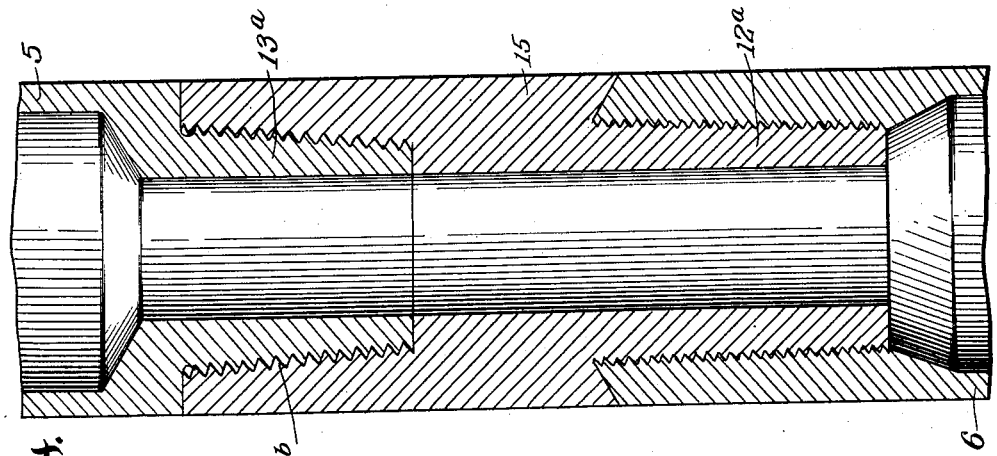
Figures 3 and 4 are sectional views of modified structures.

An especially important feature of the present invention is the employment of a single coupling sleeve in place of the two coupling sleeves or the separate "box" and "pin" members heretofore required with the tool joints, the permanent attachment of this member to one of the pipe ends and the provision of said member and the other pipe end with elements cooperating after the manner of a box and pin tool joint.

In the illustrations the sections of drill pipe to be joined are designated 5 and 6. The lower end of the upper section is "upset" to thicken and reinforce the same at 7 and in this thickened portion an internal screw seat 8 is provided, cut on a slight inward taper. The outer surface of this pipe end is smooth and continuous and formed at the end with a bevel or taper 9.

The upper end of the lower pipe section is upset and thickened at 10, in Figures 1 and 2, to a materially greater extent than the lower end of the first pipe section and this thickened portion is formed with an internal screw seat 11 of greater taper and coarser screw threads than the screw seat of the first section. This heavier and coarser screw seat also may be heat treated to harden and toughen it, as indicated by the cross section, and the external surface of this pipe end, like the first is smooth and unbroken.

The single coupling sleeve made possible by this invention is shown in Figures 1 and 2 as a unitary tubular member having oppositely extending screw shanks 12, 13, the first slightly tapered and with a relatively fine screw thread to fit the internal screw seat 8 in the upper pipe section and the second having a greater taper and relatively coarse screw threads to fit the screw seat in the lower pipe section. At the base of the upper screw shank, an under-cut or beveled shoulder 14 is provided, the purpose of which is to engage over the beveled edge of the upper pipe section to prevent spreading of the same when the member is screwed into that section and by frictionally interlocking with the pipe end to aid in fixedly securing the member to such pipe section. The taper and pitch of the screw threads of the lower stem and the socket in the lower pipe section are in approximation of a box and pin tool joint.

The screw seat in the upper pipe section may be heat treated or hardened if necessary, but ordinarily this is not necessary because the spreading tendency exerted on the pipe is overcome by the engagement of the bevel shoulder over the beveled end of the pipe. The slight taper of the stem 12 and screw seat 8 is such as to produce an interlock when the coupling member is screwed into the upper pipe section by which said member becomes in effect a unitary part of this pipe section. The finer screw threading aids in this interlocking action and the fixity and solidity of this connection may be further increased by having this stem and socket of greater length than the relatively separable stem and seat 13—11. The greater thickness of the wall for the screw seat of the lower pipe section and the greater taper of this seat provide sufficient metal to prevent spreading and distortion of this pipe end and the hardening and toughening treatment enables this socket to stand the wear and tear of making and breaking the joint.

The intermediate or shoulder portion 15 of the coupling member is shown as of the same external diameter as the pipe so that the joint and pipe are co-extensive and can pass readily through a stuffing box or other device. The continuous unbroken skin of both pipe sections largely eliminates the possibility of twist-off. The engagement of the shoulder of the coupling member over the end of the upper pipe section reinforces that section and the extra thickness and greater taper at the screw seat reinforces the lower pipe section so that the pipe ends, which in the ordinary joints are the weakest parts, in this new joint are as strong or practically as strong as the coupling member.

Figure 3:
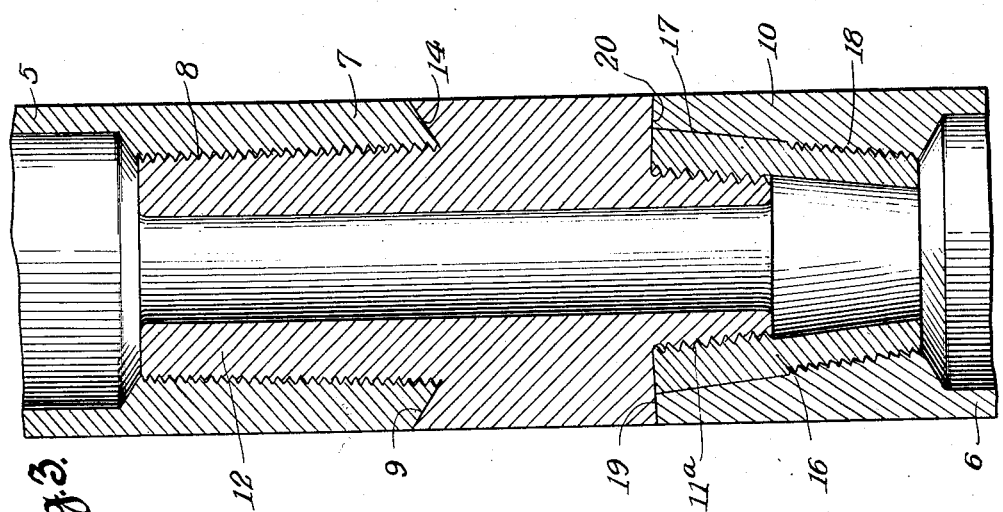

Instead of relying on a hardening of the pipe metal for the screw seat which carries the wear, an insert of harder metal may be entered in the pipe end, as indicated at 16 in Figure 3. This hardened insert in this case carries the make and break screw seat 11$^a$. It is shown as fitted in a taper seat 17 in the reinforced end of the pipe and as secured by the relatively fine screw threads 18 at the inner end of such seat. These screw threads are shown as terminating short of the start of the coarser make and break screw threads 11$^a$, leaving the outer surface of the screw insert continuous and unbroken for the length of the coarser internal screw seat, thereby reducing the possibility of fracture which might result from external screw threads located on a plane with the point where the wear and strain occurs.

In the construction illustrated, Figure 3, the plug member is provided at the projecting stem end with an under-cut shoulder 19 of sufficient lat ral width to cover the correspondingly beveled edge 20 of the pipe and to overlie the end of the screw insert. The interlock of the insert in the end of the pipe may be effected by "shrinking" the end of the pipe over the insert, by a combination of both screw joint and shrinking engagement or by forming the insert with the external screw threads or otherwise roughening the external surface of the insert and forcing it to a seat in the pipe end while the latter is in condition to be rolled or "forged" over the insert.

The embodiment of the invention illustrated in Figure 4 is similar to that first described except that the coupling sleeve or collar in this case is fixedly secured in the lower pipe section and carries the coarse thread taper socket 11$^b$ to receive a projecting coarse threaded taper stem 13$^a$ formed integral on the thickened reinforced end of the upper pipe section. In the latter case, therefore, a single coupling member in connection with a joint element formed on one pipe end suffices as a readily separable coupling capable of carrying the load and withstanding the wear.

The working of the metal in upsetting the pipe ends to a requisite thickness is another factor in strengthening the pipe and enabling the formation of one of the joint elements directly in the pipe.

To overcome any tendency of the coupling to spread the pipe end, the coupling member may be formed at the base of the coupling stem with a slightly under-cut shoulder 21 and the pipe end be formed with a corresponding bevel 22, the angle of these meeting faces being considerably less than the bevel at 9, 14 where the coupling member is fixed in the end of the other pipe section. This second beveled shoulder is thus designed simply to hold the pipe end against expanding under the repeated hammering of setting up the joint and not with a view to effecting any binding action at this point and so, differs from the first beveled engagement where the purpose is both to prevent expansion of the pipe end and also to assist in fixedly interlocking the coupling in the end of the pipe.

What is claimed is:

1. A drill pipe connection comprising a pipe section having a thickened end wall with an internal slightly tapered screw seat and a beveled end edge, a tubular coupling member having an externally screw threaded tapered shank at one end screwed fast in the screw seat of the pipe end and an undercut shoulder at the base of said shank engaging over the beveled pipe end, said member having a projecting stem at the opposite end with coarser screw threads and a greater taper than the other screw shank and a second pipe section having a reinforced end wall of greater thickness than the first pipe section, said thicker end wall having an internal tapered screw seat to receive the coarsely screw threaded taper projecting stem of the coupling member and said coupling member having no greater external dimensions than the pipe sections to permit passage of the joint with the pipe through a stuffing box or the like.

2. A connection for oil well drill pipe comprising a pipe section having a reinforced end internally screw threaded on a slight taper and provided with a beveled end edge, a hollow coupling member having an externally screw threaded slightly tapered shank screwed fast in said pipe end and provided with an under-cut shoulder engaged fixedly over the beveled end edge of the pipe, a second pipe section having a more heavily reinforced end than the first pipe section, said second pipe section and the exposed end of the coupling member having cooperating stem and socket elements with coarser screw threads and of a greater taper than the corresponding elements of the first pipe section and screw shank.

3. A drill pipe connection comprising a tubular coupling member having an intermediate portion with shoulders at opposite ends of the same and screw threaded tapered stems projecting from said shoulders, one of said stems being of less taper and having finer screw threads than the other, pipe sections having internal taper screw seats in the ends thereof, one of less taper and finer screw threads than the other fixedly receiving the less tapered and finer screw threaded shank of the coupling member and the coarser more tapered internal screw seat of the other pipe section detachably receiving the coarser threaded and more tapered stem of the coupling member, the shoulder at the base of the finer threaded and less tapered stem being under-cut and the end of the pipe section engaged thereby being beveled to interlock frictionally and hold the pipe end against spreading.

4. As a new article of manufacture, a coupling for oil well drill pipe comprising a sleeve of massive proportions having an intermediate cylindrical portion with shoulders at opposite ends of the same and tapered screw threaded stems projecting in opposite directions from said shoulders, one of said stems being longer, of less taper and having finer screw threads than the other to fixedly interlock in a correspondingly threaded and tapered socket in the end of a drill pipe and the coarser screw threads and greater taper of the other stem enabling same to separably engage with the correspondingly screw threaded and tapered socket in another section of drill pipe.

5. As a new article of manufacture, a coupling for oil well drill pipe comprising a sleeve of massive proportions having an intermediate cylindrical portion with shoulders at opposite ends of the same and tapered screw threaded stems projecting in opposite directions from said shoulders, one of said stems being longer, of less taper and having finer screw threads than the other to fixedly interlock in a correspondingly threaded and tapered socket in the end of a drill pipe and the coarser screw threads and greater taper of the other stem enabling same to separably engage with the correspondingly screw threaded and tapered socket in another section of drill pipe, one of the shoulders aforesaid being under-cut to engage over a correspondingly beveled end of a pipe section.

6. As a new article of manufacture, a coupling for oil well drill pipe comprising a sleeve of massive proportions having an intermediate cylindrical portion with shoulders at opposite ends of the same and tapered screw threaded stems projecting in opposite directions from said shoulders, one of said stems being longer, of less taper and having finer screw threads than the other to fixedly interlock in a correspondingly threaded and tapered socket in the end of a drill pipe and the coarser screw threads and greater taper of the other stem enabling same to separably engage with the correspondingly screw threaded and tapered socket in another section of drill pipe both of said shoulders being under-cut to engage over correspondingly beveled ends of the pipe sections, but the shoulder at the base of the longer screw stem being more deeply under-cut than the other shoulder to assist in the fixing of the said screw stem in the pipe section which it engages.

In witness whereof I have hereunto set my hand this 6th day of July, 1925.

WALDO SHELDON.